United States Patent
Matsubayashi

(10) Patent No.: US 8,566,870 B2
(45) Date of Patent: Oct. 22, 2013

(54) HIGHER SPEED HIGH DEFINITION TELEVISION (HDTV) CHANNEL AND EXTERNAL INPUT SURFING

(75) Inventor: Koji Matsubayashi, San Diego, CA (US)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 13/077,734

(22) Filed: Mar. 31, 2011

(65) Prior Publication Data

US 2012/0249881 A1    Oct. 4, 2012

(51) Int. Cl.
*H04N 5/455*    (2006.01)
*H04N 7/173*    (2011.01)

(52) U.S. Cl.
USPC ............... 725/38; 725/92; 725/93; 725/100

(58) Field of Classification Search
USPC ...................... 725/38, 92, 93, 100
See application file for complete search history.

(56) References Cited

U.S. PATENT DOCUMENTS 5,734,589 A * 3/1998 Kostreski et al. .......... 715/716
7,376,692 B2 * 5/2008 Kovacevic et al. ......... 709/200
8,265,453 B2 * 9/2012 Okubo et al. .............. 386/241

OTHER PUBLICATIONS

Pixel Magic Systems, Ltd.—Crystalio Release Note v4.0.4—pp. 1-15, downloaded from the internet on Jun. 29, 2010 from http://www.crystalio.com/download/ReleaseNote404.pdf.
ATI-ATI Propietary Linux Release Notes—pp. 1-5, downloaded from the internet on Jun. 29, 2010 from http://www2.ati.com/drivers/linux/linux_3.12.0.html.

* cited by examiner

*Primary Examiner* — Kieu Oanh T Bui
(74) *Attorney, Agent, or Firm* — John P. O'Banion

(57) ABSTRACT

A high definition television (HDTV) is capable of displaying one or more streams. Typical stream changing is accomplished by freshly determining the stream settings (frame rate, resolution, refresh method) as each stream is detected, resulting in slow to tortuously slow stream surfing. Here, the HDTV stream settings are stored in a list of present streams, so that stream surfing may continue at much higher rates without redetermining the stream settings with each stream change. The improved stream surfing may be turned on or off at user discretion. Additionally, individual streams, as well as other audio/video inputs may also be edited to user-desired stream settings by accepting user inputs. The HDTV may automatically detect HDTV settings for each currently tuned stream of a list of potential streams, or may download the HDTV setting for a specific location of the HDTV.

19 Claims, 3 Drawing Sheets

HIGHER SPEED HIGH DEFINITION TELEVISION (HDTV) CHANNEL AND EXTERNAL INPUT SURFING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to high definition television (HDTV) and more particularly to HDTV stream switching at higher rates.

2. Description of Related Art

Traditional HDTV devices determine the broadcast parameters for a broadcast signal or other input anew with each input change. Such determination can take considerable time, and is frequently annoying to users used to prior analog television (TV) sets, whose stream changing characteristics were near instant.

BRIEF SUMMARY OF THE INVENTION

An aspect of the invention is a high definition television (HDTV), comprising: a high definition television (HDTV), whereupon at least one of one or more input streams are displayed; and means for storing a stream setting for each of the input streams.

A stream is any input that ultimately is played on the HDTV, at least in part, and can be audio, video, or audio-video in nature.

The means for storing may comprise digital memory, wherein the stream settings are stored. A change from one stream to another may require less than one second. Such a change may also be selected from a group of times consisting of less than: 0.5 seconds, 0.4 seconds, 0.3 seconds, 0.2 seconds, and 0.1 seconds.

The means for storing the stream setting for each of the input streams may comprise: a computer program executable on the HDTV capable of executing steps consisting of: stepping through a list of potential streams; determining if one of the potential streams is present on a current stream setting; and if the current stream setting indicates a valid stream is present, then: determining the current stream HDTV settings; and storing the current stream HDTV settings as the stream setting in a list of the present streams.

The computer program may further comprise changing the current stream to a new stream using the stream settings in the list of present streams.

The changing of the current stream may comprise determining j, a number of entries in the list of present streams; and sequencing through the list of present streams.

The sequencing step may comprise incrementing an index k to find a new current stream according to a formula $k=(k+1) \bmod (j)$ to increase the current stream. Alternatively, the sequencing step may comprise decrementing an index k to find a new current stream according to a formula $k=(k-1) \bmod (j)$ to decrease the current stream.

The computer program changing step above may or may not use the stream settings in the list of present streams, depending on user inputs. When the list of present streams is not used, traditional determination of the input characteristics are used to characterize the input in terms of resolution (pixel size), frame rate, and refresh method (progressive or interlaced). Analogous methods may be used to determine the characteristics of those streams that are not traditional broadcast or cable inputs.

The computer program above may further comprise inputting manual stream settings into the list of present streams.

Additionally, the computer program may further comprise editing one or more of the stream settings in the list of present streams by accepting user inputs.

Another aspect of the invention is a method of changing inputs on a High Definition Television (HDTV), comprising: providing an HDTV; sequencing through a list of potential streams on the HDTV; determining if one of the potential streams is present on a current stream setting; and if the current stream setting indicates a valid stream is present, then: determining the current stream HDTV settings; and storing the current stream HDTV settings as the stream setting in a list of the present streams.

The method may further comprise changing the current stream to a new stream using the stream settings in the list of present streams.

The changing of the current stream may comprise determining j, a number of entries in the list of present streams; and sequencing through the list of present streams. Generally, the sequencing is done via an index that increments or decrements by one.

The sequencing step may comprise incrementing an index k to find a new current stream according to a formula $k=(k+1) \bmod (j)$ to increase the current stream. Alternatively, the sequencing step may comprise decrementing an index k to find a new current stream according to a formula $k=(k-1) \bmod (j)$ to decrease the current stream.

In the method above, the changing the current stream step may or may not use the stream settings in the list of present streams, depending on user inputs.

The method above may further comprise inputting manual stream settings into the list of present streams.

The method above may further comprise editing one or more of the stream settings in the list of present streams by accepting user inputs.

In another aspect of the invention, a method of changing inputs on a High Definition Television (HDTV) may comprise: providing an HDTV; downloading to the HDTV a list of potential streams and their HDTV settings for a geographic location of the HDTV; and storing the list of potential streams and their HDTV settings into an HDTV stream setting for each stream in a list of present streams. Here, the downloading may occur through an IPTV connection, or over the Internet without an IPTV connection, or directly through digital data connection with another source device. The source device may be a server comprising HDTV setting information for a variety of geographic locations.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Introduction

Current HDTV performs auto detection of a selected input resolution each time a new input stream is selected; however, this process takes several seconds.

While users typically only think of "channel" surfing, engineers think more in terms of "stream" input surfing. Thus, while the term "channel" typically only relates to broadcast video, the term "stream" contains every aspect of the "channel" along with any additional inputs that may be displayed or played on the HDTV, as further detailed below. The broader term "stream" is therefore used herein.

By using this invention, it would be possible to improve the stream switching speed by skipping the auto detection process and storing the previous stream settings.

Initialization

Figure 1:
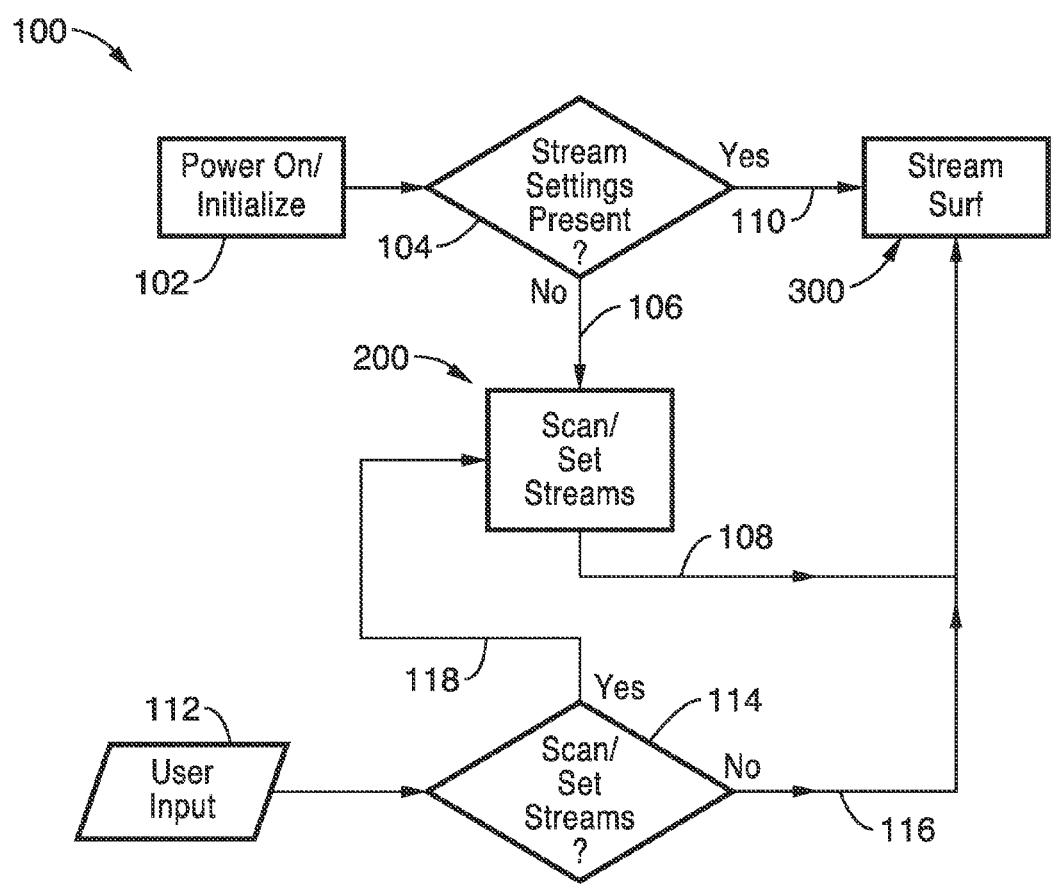
FIG. 1 is a flowchart of a method of setting up a lookup table of present streams on a high definition television (HDTV).

Refer now to FIG. 1, which is a flowchart 100 of a method of setting up a lookup table of streams present on a high definition television (HDTV). When power is first applied 102, it is determined whether there are stream settings present 104. If no stream settings are present 106, then a reference list of N potential streams are scanned and set 200. This scanning and setting 200 step is also variously known as an "auto program" or "auto scan" step. After the streams are set by the Scan/Check Streams block 200, control is passed 108 to a stream surf module 300.

Otherwise, when power is first applied 102, it is determined whether there are stream settings present 104. If streams settings are present, then control is passed 110 to the stream surf module 300.

A user may asynchronously enter a user input 112, which is tested to determine (in a Scan/Check Streams block 114) whether or not the scanning and setting process must be repeated, perhaps due to a change in location, programming, or other reason. If the Scan/Check Streams block 114 test is true, then the Scan/Check Streams block 200 streams are set as previously described.

The Scan/Check Streams test block 114 may output values of streams to be scanned or checked as a single stream, none of the potential streams, or all potential streams. Inputs such as over the air or cable high definition video, HDMI, PC Input, VGA Input, and the various Video inputs available on the particular HDTV may also be readily scanned and set using either the same or analogous methods.

In addition to traditional ATSC and NTSC streams, the Scan/Test Streams test block 114 would also have provisions to reference alternative inputs ports, such as HDMI, PC Input, VGA Input, and Video inputs for those present on the HDTV. In one embodiment, these alternative input ports may simply be appended to the list of potential streams.

Should the user input 112 into the Scan/Check Streams test block 114 result in a "No" 116 output (which means the user does not want execute anything in the Scan/Check Streams block 200), control would then continue with the stream surf module 300.

Should the user input 112 into the Scan/Check Streams test block 114 result in a "Yes" output 118 (which means the user does want execute the Scan/Check Streams block 200), then control passes to the list of potential streams in the Scan/Check Streams block 200.

Although for simplicity of the flowchart the Scan/Check Streams test block 114 shows only No 116 and Yes 118 outputs, this is readily modified to rescan only one or more selected streams, or other selected inputs, which may be input into the Scan/Check Streams block 200 as a list of the number of streams to be scanned, and their designations.

"Auto program" procedures, as used in the Scan/Check Streams block 200, may be frequency based (where channels are searched for through a sequence of potential input frequencies), and operates to store stream information (which may include, without limitation, "format" information, such as resolution, frame rate, refresh method, frequency, and other channel information) when a channel is found.

After "auto program" has been executed, when it is desired to tune to a channel, the previously stored "format" information is used to quickly tune to a new destination stream, or channel.

Figure 2:
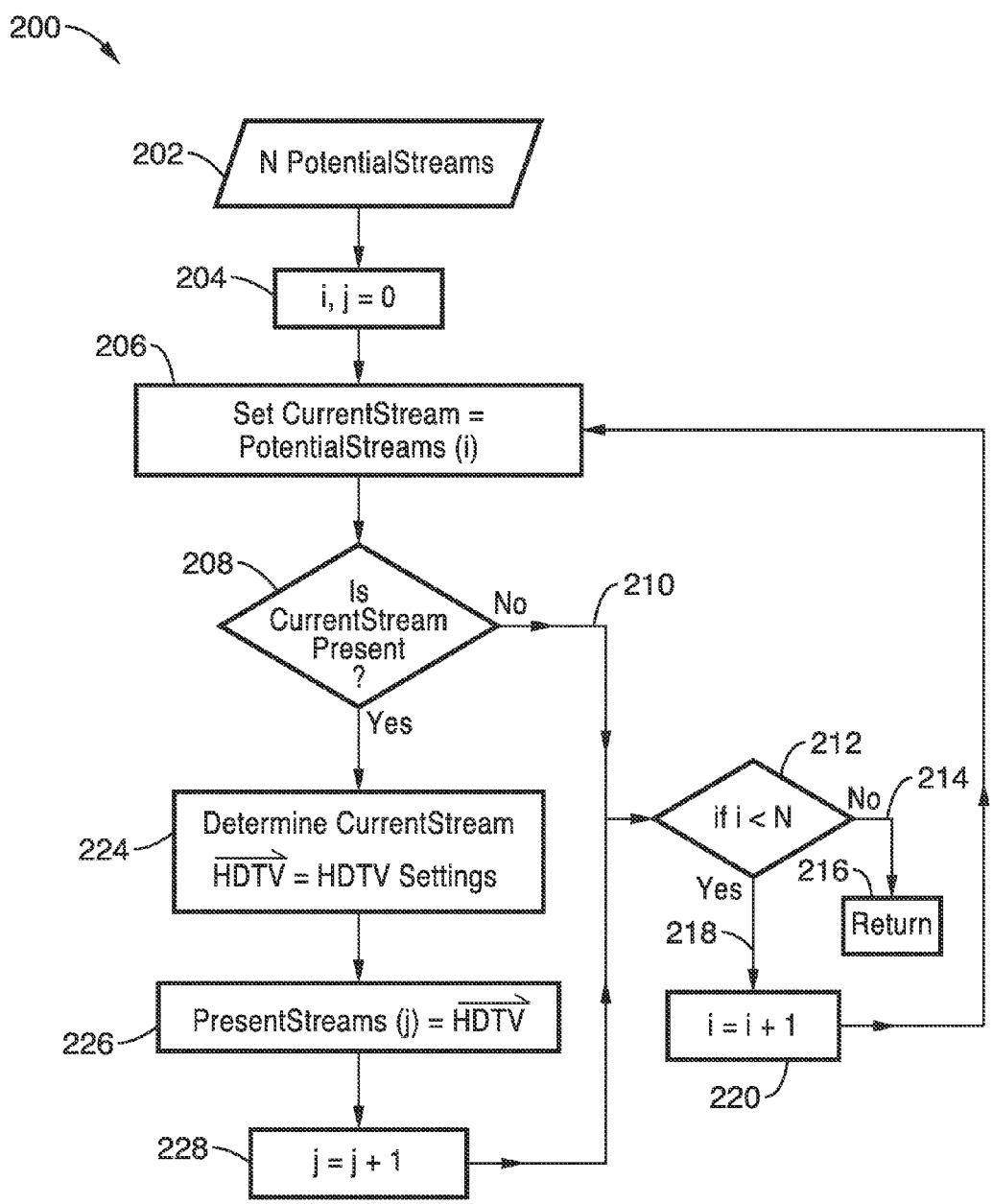
FIG. 2 is a simplified flowchart of the Scan/Check Streams block shown above in FIG. 1.

Refer now to FIG. 2, which is a simplified flowchart of the Scan/Check Streams block 200 previously found above in FIG. 1. Here, N PotentialStreams 202 is input. The PotentialStreams array may have additional information describing how the stream would to be accessed, such as ATSC, NTSC, cable, antenna (over the air), satellite, HDMI, PC Input, or various Video Inputs. Next, counters i and j are set to zero 204. Next, the Set Current Stream is set to PotentialStreams (i) 206, according to additional information describing how the stream is to be accessed. The high definition television (HDTV) is then tuned to the Current Stream, and then determines whether or not the Current Stream is present in block "Is Current Stream Present?" 208. A stream is deemed present when it may be received with a sufficient Signal to Noise (S/N) ratio, or basically, when somebody can view or listen to it in a meaningful way.

If the Current Stream is not found to be present from in block "Is Current Stream Present?" 208, then the "No" 210 exit is taken, and it is then determined whether i<N 212, where i acts as a counter cycling through the list of potential streams PotentialStreams (i) available to the HDTV. N is taken to be the maximum number of potential streams that are present.

If i<N 212 is not true (or i≥N), then the "No" branch 214 is taken, as all potential streams have been scanned, and the process then returns 216.

If the Current Stream is found to be present from in block "Is Current Stream Present?" 208, then the Determine Current Stream $\overrightarrow{HDTV}$=HDTV Settings block 224 stores the stream settings previously found in the block "Is Current Stream Present?" 208.

Next, in "Input Stream j=$\overrightarrow{HDTV}$" 226, the next sequential, or $j^{th}$ input stream is stored with the settings found in the Determine CurrentStream $\overrightarrow{HDTV}$=HDTV Settings block 224. Next, the input stream j (which will be used for stream surfing purposes) is incremented by 1, and control passes to block i<N 212, to continue sequencing through the list of potential streams.

In the "Determine CurrentStream HDTV Settings= $\overrightarrow{HDTV}$" block 224, the vector $\overrightarrow{HDTV}$ is loaded with the CurrentStream HDTV settings, such as the frame size in pixels, scanning system refresh method (either progressive or interlaced), the scanning rate in Hz. The $\overrightarrow{HDTV}$ vector is then stored into PresentStreams (j), where j acts as an index counter to the PresentStreams found array. Next, the j counter is incremented by 1 in block 228, and control passes to block i<N 212, to continue sequencing through the list of potential streams.

When the process returns 216, the j counter contains the number of Present Streams found, and the PresentStreams (j) array contains the information about all of the streams that have been successfully found. The additional information found in the PotentialStreams as to how to access the stream is also copied as part of $\overrightarrow{HDTV}$.

Figure 3:
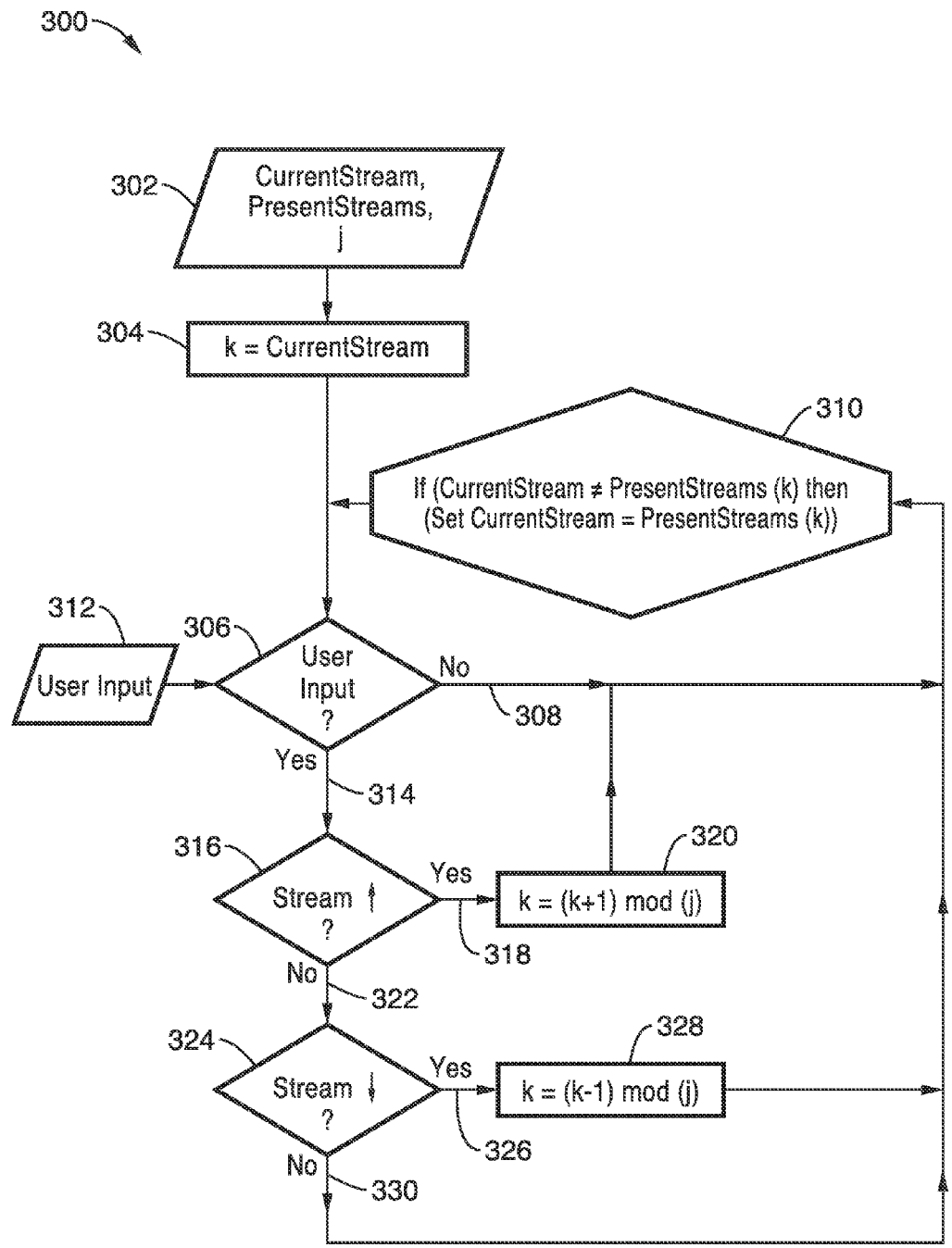
FIG. 3 is a flowchart of a typical stream surfing module.

Refer now to FIG. 3, which is a flowchart of the stream surfing module 300. Here, the array of PresentStreams, the CurrentStream index, and j (the number of PresentStreams) is provided as initial inputs 302. Streams are accessed and sequentially traversed with user inputs such as Stream ↑, or Stream ↓, to respectfully increase or decrease the stream index. Initially, values of the CurrentStream, the PresentStreams array, and the number of PresentStreams, j are input.

An index k is set 304 to the CurrentStream index. Next, a continuous User Input loop is entered. Here, a test 306 is made to determine whether a user input has occurred. If not 308, then conditional block 310 determines if the CurrentStream has changed; if so, then the CurrentStream is changed, with an accompanying change to the HDTV display. Then, test 306 is made again. Although the recurrent loop through the user input 306 is a typical looped input, it may instead be readily changed to an interrupt driven routine.

Should a User Input 312 be found, the test 306 exits as a Yes condition 314. Next, it is determined whether a Stream ↑ command has been entered 316. If so 318, then index k is set according to the formula 320 k=(k+1)mod(j). Control then passes back to the conditional block 310 and then a test 306 for further user inputs 312 is made.

Should there not be a Stream ↑ command entered 322, then it is next determined whether a Stream ↓ command has been entered 324. If so 326, then index k is set according to the formula 328 k=(k−1)mod(j). Control then passes back to the conditional block 310, and then to test 306 for further user inputs.

Although either a Stream ↑ command or a Stream ↓ command is encompassed here, it is always good programming practice to build robust code. Hence, should the User Input 312 be neither a Stream ↑ command nor a Stream ↓ command, then control 330 would pass back to the conditional block 310 and then to test 306 for further user inputs Other user inputs may be used to access those PotentialStreams that are according to their input source, such as cable, antenna (over the air), satellite, HDMI, PC Input, or various Video Inputs.

Other embodiments could provide user input to set resolutions (for example, for HDMI input) manually and turn off the auto detection and setting functions, all at the behest of user inputs.

Should a user desire not to use the stored stream settings, perhaps in the case where an HDTV is extremely mobile, the stored stream setting could be enabled or disabled at user discretion. Additionally, the auto detection and setting functions could be enabled or disabled based on other criteria automatically.

In yet another embodiment, one may download to the HDTV a list of potential streams and their HDTV settings for a geographic location of the HDTV; and may store the list of potential streams and their HDTV settings into an HDTV stream setting for each stream in a list of present streams.

This list of present streams would then be used to quickly execute stream surfing using the downloaded HDTV settings.

Alternatively, the downloaded list of potential streams and their HDTV settings may be sequentially tested on the HDTV one at a time through changing of a current stream to the downloaded HDTV settings for proper reception.

If the current stream is found to be properly received, it and its HDTV settings are then added to the list of present streams.

If the current stream is not found properly received, then the current stream may still be scanned for a set of correct HDTV settings that do allow proper reception, which may then be stored in the list of present streams.

If no setting is found for a particular current stream, then that stream would then be deleted from the list of present streams.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. A high definition television (HDTV) apparatus, comprising: a high definition television (HDTV), whereupon at least one of one or more input streams are displayed; and means for storing a stream setting for each of the input streams.

2. The apparatus of embodiment 1, wherein the means for storing comprises: digital memory, wherein the stream settings are stored.

3. The apparatus of embodiment 1, wherein a change from one stream to another requires a time selected from the group of times consisting of less than: 1.0 seconds, 0.5 seconds, 0.4 seconds, 0.3 seconds, 0.2 seconds, and 0.1 seconds.

4. The apparatus of embodiment 1, wherein the means for storing the stream setting for each of the input streams comprises: a computer program executable on the HDTV for performing steps comprising: (a) stepping through a list of potential streams; (b) determining if one of the potential streams is present on a current stream setting; and (c) if the current stream setting indicates a valid stream is present, then: determining the current stream HDTV settings; and storing the current stream HDTV settings as the stream setting in a list of the present streams.

5. The apparatus of embodiment 4, wherein the computer program further performs steps comprising: changing the current stream to a new stream using the stream settings in the list of present streams.

6. The apparatus of embodiment 5, wherein said changing the current stream comprises: determining j, a number of entries in the list of present streams; and sequencing through the list of present streams.

7. The apparatus of embodiment 6, wherein said sequencing comprises: incrementing an index k to find a new current stream according to a formula $k=(k+1)\bmod(j)$ to increase the current stream.

8. The apparatus of embodiment 6, wherein said sequencing comprises: decrementing an index k to find a new current stream according to a formula $k=(k-1)\bmod(j)$ to decrease the current stream.

9. The apparatus of embodiment 5, wherein the computer program changing step may or may not use the stream settings in the list of present streams, depending on user inputs.

10. The apparatus of embodiment 5, wherein the computer program further performs steps comprising: inputting manual stream settings into the list of present streams.

11. The apparatus of embodiment 5, wherein the computer program further performs steps comprising: editing one or more of the stream settings in the list of present streams by accepting user inputs.

12. A method of changing inputs on a High Definition Television (HDTV), comprising: providing an HDTV; sequencing through a list of potential streams on the HDTV; determining if one of the potential streams is present on a current stream setting; and if the current stream setting indicates a valid stream is present, then: determining the current stream HDTV settings; and storing the current stream HDTV settings as the stream setting in a list of the present streams.

13. The method of embodiment 12, further comprising: changing the current stream to a new stream using the stream settings in the list of present streams.

14. The method of embodiment 13, wherein said changing the current stream comprises: determining j, a number of entries in the list of present streams; and sequencing through the list of present streams.

15. The method of embodiment 14, wherein said sequencing comprises: incrementing an index k to find a new current stream according to a formula $k=(k+1)\bmod(j)$ to increase the current stream.

16. The method of embodiment 14, wherein said sequencing comprises: decrementing an index k to find a new current stream according to a formula $k=(k-1)\bmod(j)$ to decrease the current stream.

17. The method of embodiment 13, wherein said changing the current stream may or may not use the stream settings in the list of present streams, depending on user inputs.

18. The method of embodiment 12, further comprising: inputting manual stream settings into the list of present streams.

19. The method of embodiment 12, further comprising: editing one or more of the stream settings in the list of present streams by accepting user inputs.

20. A method of changing inputs on a High Definition Television (HDTV), comprising: providing an HDTV; downloading to the HDTV a list of potential streams and their HDTV settings for a geographic location of the HDTV; and storing the list of potential streams and their HDTV settings into an HDTV stream setting for each stream in a list of the present streams.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A high definition television (HDTV) apparatus, comprising:
 (a) a high definition television (HDTV), wherein at least one of one or more input streams are displayed;

(b) wherein the input streams are selected from a group consisting of: audio, high definition video, HDMI, PC Input, and VGA Input; and
(c) means for storing a stream setting for each of the input streams;
(d) wherein the means for storing the stream setting for each of the input streams comprises a computer program executable on the HDTV for performing steps comprising:
(i) stepping through a list of potential streams;
(ii) determining if one of the potential streams is present on a current stream setting; and
(iii) if the current stream setting indicates a valid stream is present, then:
determining the current stream HDTV settings; and
storing the current stream HDTV settings as the stream setting in a list of the present streams;
(e) wherein the stream setting comprises frame rate, resolution, and refresh method.

2. The apparatus recited in claim 1, wherein the means for storing comprises:
digital memory, wherein the stream settings are stored.

3. The apparatus recited in claim 1, wherein a change from one stream to another stream requires a time selected from the group of times consisting of less than: 1.0 seconds, 0.5 seconds, 0.4 seconds, 0.3 seconds, 0.2 seconds, and 0.1 seconds.

4. The apparatus recited in claim 1, wherein the computer program further performs steps comprising:
changing the current stream to a new stream using the stream settings in the list of present streams.

5. The apparatus recited in claim 4, wherein said changing the current stream comprises:
determining j, a number of entries in the list of present streams; and
sequencing through the list of present streams.

6. The apparatus recited in claim 5, wherein said sequencing comprises:
incrementing an index k to find a new current stream according to a formula $k=(k+1)\bmod(j)$ to increase the current stream.

7. The apparatus recited in claim 5, wherein said sequencing comprises:
decrementing an index k to find a new current stream according to a formula $k=(k-1)\bmod(j)$ to decrease the current stream.

8. The apparatus recited in claim 4, wherein said changing the current stream may or may not use the stream settings in the list of present streams, depending on user inputs.

9. The apparatus recited in claim 4, wherein the computer program further performs steps comprising:
inputting manual stream settings into the list of present streams.

10. The apparatus recited in claim 4, wherein the computer program further performs steps comprising:
editing one or more of the stream settings in the list of present streams by accepting user inputs.

11. A method of changing inputs on a High Definition Television (HDTV), comprising:
providing an HDTV;
sequencing through a list of potential streams on the HDTV;
wherein the potential streams are selected from a group consisting of: audio, high definition video, HDMI, PC Input, and VGA Input;
determining if one of the potential streams is present on a current stream setting; and
if the current stream setting indicates a valid stream is present, then:
determining the current stream HDTV settings; and
storing the current stream HDTV settings as the stream setting in a list of the present streams;
wherein the stream setting comprises frame rate, resolution, and refresh method.

12. The method recited in claim 11, further comprising:
changing the current stream to a new stream using the stream settings in the list of present streams.

13. The method recited in claim 12, wherein said changing the current stream comprises:
determining j, a number of entries in the list of present streams; and
sequencing through the list of present streams.

14. The method recited in claim 13, wherein said sequencing comprises:
incrementing an index k to find a new current stream according to a formula $k=(k+1)\bmod(j)$ to increase the current stream.

15. The method recited in claim 13, wherein said sequencing comprises:
decrementing an index k to find a new current stream according to a formula $k=(k-1)\bmod(j)$ to decrease the current stream.

16. The method recited in claim 12, wherein said changing the current stream may or may not use the stream settings in the list of present streams, depending on user inputs.

17. The method recited in claim 11, further comprising:
inputting manual stream settings into the list of present streams.

18. The method recited in claim 11, further comprising:
editing one or more of the stream settings in the list of present streams by accepting user inputs.

19. A method of changing inputs on a High Definition Television (HDTV), comprising:
providing an HDTV;
downloading to the HDTV a list of potential streams and their HDTV settings for a geographic location of the HDTV; and
storing the list of potential streams and their HDTV settings into an HDTV stream setting for each stream in a list of the present streams;
wherein the potential streams are selected from a group consisting of: audio, high definition video, HDMI, PC Input, and VGA Input;
wherein each HDTV stream setting comprises frame rate, resolution, and refresh method.

* * * * *